United States Patent
Jibiki

[11] Patent Number: 6,131,294
[45] Date of Patent: Oct. 17, 2000

[54] TELESCOPIC SIGHT WITH DETACHABLE NIGHT VISION APPARATUS

[75] Inventor: Ubao Jibiki, Kawasaki, Japan

[73] Assignee: Hakko Co., LTD, Japan

[21] Appl. No.: 09/145,147

[22] Filed: Sep. 1, 1998

[30] Foreign Application Priority Data

Jan. 27, 1998 [JP] Japan .................................. 10-027863

[51] Int. Cl.$^7$ ................................ F41G 1/38; F41G 1/34; G02B 23/00

[52] U.S. Cl. ................................ 33/245; 33/241; 33/261; 42/101; 42/103; 359/353; 359/419

[58] Field of Search .................... 42/101, 103; 33/261, 33/245, 249, 250, 241; 356/247; 359/353, 419, 422

[56] References Cited

U.S. PATENT DOCUMENTS

| | | | |
|---|---|---|---|
| 2,946,255 | 7/1960 | Bolay .................................. 250/330 |
| 3,392,450 | 7/1968 | Herter et al. ........................... 33/245 |
| 3,407,302 | 10/1968 | Bouwers ............................. 359/403 |
| 3,464,757 | 9/1969 | Schmidt et al. ..................... 359/353 |
| 3,509,344 | 4/1970 | Bouwers ............................. 250/333 |
| 3,529,882 | 9/1970 | Schmidt ............................. 359/353 |
| 3,712,702 | 1/1973 | Schmidt ............................. 359/419 |
| 3,971,933 | 7/1976 | Adamson, Jr. ....................... 250/330 |
| 4,000,419 | 12/1976 | Crost et al. ..................... 250/227.11 |
| 4,241,252 | 12/1980 | Litman ............................. 250/214 VT |
| 4,255,013 | 3/1981 | Allen .................................. 359/422 |
| 4,341,022 | 7/1982 | Santoro ................................ 33/245 |
| 4,440,476 | 4/1984 | Jacobson ........................... 313/524 |
| 4,582,400 | 4/1986 | Lough ................................ 359/402 |
| 4,776,126 | 10/1988 | Williams ............................... 42/101 |
| 4,822,994 | 4/1989 | Johnson ............................... 33/250 |
| 4,961,278 | 10/1990 | Johnson ............................... 42/101 |
| 5,035,472 | 7/1991 | Hansen ................................ 359/350 |
| 5,528,418 | 6/1996 | Bowman, Jr. ......................... 359/400 |
| 5,867,915 | 2/1999 | McMillan ............................. 33/245 |
| 5,884,884 | 3/1999 | Sauterd ............................... 248/314 |
| 5,937,562 | 8/1999 | Brough ................................ 42/103 |

FOREIGN PATENT DOCUMENTS

| | | | |
|---|---|---|---|
| 789817 | 7/1968 | Canada .................................. 42/101 |
| 193236 | 2/1986 | European Pat. Off. . |
| 267164 | 10/1987 | European Pat. Off. . |
| 3535023 | 4/1987 | Germany . |
| 8-334703 | 12/1996 | Japan . |
| 2135789 | 9/1984 | United Kingdom . |

*Primary Examiner*—Michael J. Carone
*Assistant Examiner*—Fredrick T. French, III
*Attorney, Agent, or Firm*—Stephen Donovan

[57] ABSTRACT

An object of the present invention is to provide a telescopic sight which is characterized by the fact that in a telescopic sight for day and night use, [a] a night time imaging device can be connected without removing the ocular tube body connected to the ocular side of the objective tube body when there is a changeover from day time use to night time use, so that the telescopic sight can be used at night, [b] the sight can be used "as is" as a day time sight by removing the night time imaging device, and [c] attachment or detachment for day time or night time use can be accomplished quickly, easily and reliably by means of one hand while the gun is held in the other hand.

13 Claims, 5 Drawing Sheets

TELESCOPIC SIGHT WITH DETACHABLE NIGHT VISION APPARATUS

FIELD OF INDUSTRIAL UTILIZATION

The present invention concerns a telescopic sight which is mounted on hunting guns or guns used in games or sports, and the like, and which allows sighting both in the day time and at night.

Conventionally, telescopic sights for day and night use, which can be used both in the day time and at night, have been constructed as described in the specification of U.S. Pat. No. 4,822,994, or as described in the Japanese Patent Application Kokai No. 8-334703 which was previously submitted by the inventor of the present invention. Such conventional telescopic sights are constructed as follows: specifically, in the case of the specification of U.S. Pat. No. 4,822,994, the telescopic sight is constructed from three independent parts, i.e., an objective tube body which is equipped with an objective lens system, an ocular tube body which is equipped with an ocular lens system, and a night time imaging device known as an image intensifier (i.e., an imaging device equipped with an electron multiplier). Furthermore, in the case of Japanese Patent Application Kokai No. 8-334703, the telescopic sight is also constructed from three parts, i.e., an objective tube body, an ocular tube body for day time use which is connected to the ocular side of the objective tube body, and an ocular tube body for night time use which has a built-in night time imaging device.

When the above-mentioned conventional telescopic sights are used in the day time, the above-mentioned ocular tube body or ocular tube body for day time use is directly connected to the ocular side of the objective tube body to form the telescopic sight. When the above-mentioned telescopic sights are used at night, the above-mentioned ocular tube body or ocular tube body for day time use is removed from the objective tube body, and instead of these parts, the above-mentioned night time imaging device and ocular tube body are successively connected, or the above-mentioned ocular tube body for night time use is connected, thus forming a telescopic sight for night time use.

Problems Which the Present Invention Attempts to Solve

In the above-mentioned conventional telescopic sights for day and night use, when there is a changeover from day time use to night time use, the ocular tube body connected to the ocular side of the objective tube body is first removed from the objective tube body. Then, a telescopic sight for night time use is formed as follows: i.e., the above-mentioned night time imaging device is connected with the light-receiving surface of said imaging device facing the ocular side of the objective tube body, after which the ocular tube body that was previously removed is again connected facing the imaging surface of the night time imaging device, or else the above-mentioned ocular tube body for night time use is connected in place of the ocular tube body for day time use that was removed from the objective tube body. In the case of such a changeover, it is necessary at least to detach the objective tube body and ocular tube body, and to perform two or three operations as described above. Furthermore, the same two or three operations must also be performed when changing over from night time use to day time use.

There is a need to minimize the number of above-mentioned changeover operations that must be performed during hunting or games, etc., and to allow these operations to be performed easily.

Furthermore, the following problem has also been encountered: i.e., it is difficult to detach and re-attach the ocular tube body in a quick and reliable manner with one hand while holding the gun with the other hand with only the objective tube body fastened to the gun.

In order to solve the above-mentioned problems, the object of the present invention is to provide a telescopic sight [a] which can be used on hunting guns and guns used for sports or games, [b] in which the changeover operation between day time use and night time use is easy, and [c] in which there is no fogging of the lenses.

The following problem has arisen in the past: i.e., when a telescopic sight is formed following a changeover from day time use to night time use, the temperature of the air inside the telescopic sight is caused to drop to a temperature below the dew point by the cold night time air that is encountered during use, so that condensation forms on the lens surfaces inside the objective tube body and ocular tube body, thus making sighting difficult.

Furthermore, the problem of condensation forming on the lens surfaces inside the objective tube body and ocular tube body is similarly encountered in cases where the sight is changed over to day time use during periods of high humidity.

Means Used to Solve the Above-mentioned Problems

Accordingly, in order to achieve the above-mentioned object, the present invention provides a telescopic sight which is characterized by the fact that a night time imaging device equipped with a night time imaging optical system is mounted in a detachable manner on a telescopic sight main body which has a day time sighting optical system equipped with an objective optical system and an ocular optical system, without removing the day time sighting optical system from said telescopic sight main body.

In the present invention, a telescopic sight for night time use can be formed by mounting a night time imaging device equipped with a night time imaging optical system without removing a day time sighting optical system from the telescopic sight main body which is equipped with the day time sighting optical system. Furthermore, a telescopic sight for day time use can be formed by removing the night time imaging device equipped with a night time imaging optical system without removing the day time sighting optical system from the telescopic sight main body.

The present invention also provides a telescopic sight which is characterized by the fact that in the telescopic sight, the night time imaging device is mounted in a detachable manner so that the night time imaging optical system is interposed between the objective optical system and ocular optical system of the telescopic sight main body.

As a result of this construction, it is possible, by utilizing an optical space in which optical functions can be divided between the objective optical system and ocular optical system of the telescopic sight main body, to mount the night time imaging device in a detachable manner so that the night time imaging optical system is interposed without complicating the sighting optical system.

The present invention also provides a telescopic sight which is characterized by the fact that in the above-mentioned telescopic sight, a mounting hole which is used to mount the night time imaging optical system of the night time imaging device is formed in the outer circumferential surface of the telescopic sight main body, and the night time imaging device is mounted in a detachable manner in said mounting hole.

Since the night time imaging device can be detachably mounted by inserting the night time imaging optical system into a mounting hole formed in the outer circumferential surface of the telescopic sight main body, the night time imaging device can be quickly, easily and reliably mounted in or removed from the mounting hole in the outer circumferential surface using one hand, while the gun is held with the other hand after the telescopic sight main body has been fastened to the gun.

The present invention also provides a telescopic sight which is characterized by the fact that in the above-mentioned telescopic sight, the night time imaging device is mounted on the outer circumference of the telescopic sight main body in a manner which allows attachment or detachment by a one-touch operation using a one-touch attachment and detachment mechanism.

As a result of this construction, the night time imaging device can be quickly, easily and reliably attached or detached by means of a one-touch operation using one hand, while the gun is held with the other hand after the telescopic sight main body has been fastened to the gun.

The present invention also provides a telescopic sight which is characterized by the fact that in the above-mentioned telescopic sight an opening-and-closing cover which opens and closes the above-mentioned mounting hole is disposed on the telescopic sight main body.

In this case, the night time imaging device can be mounted in or removed from the mounting hole by opening or closing the opening-and-closing cover; accordingly, a light-blocking action and anti-dust action are obtained in cases where the telescopic sight is used as a day time telescopic sight.

The present invention also provides a telescopic sight which is characterized by the fact that in the above-mentioned telescopic sight an ocular tube body equipped with the above-mentioned ocular optical system is installed so that said ocular tube body can be moved relative to the telescopic sight main body between a day time ocular optical system position in which the night time imaging device is not mounted, and a night time ocular optical system position which allows the mounting of the night time imaging device.

Here, in cases where the focusing position of the objective optical system that is to be observed by the ocular optical system is displaced as a result of the night time imaging optical system being interposed between the objective optical system and ocular optical system of the telescopic sight main body, clear sighting corresponding to day time or night time conditions can be achieved by moving the ocular tube body between a day time ocular optical system position in which the night time imaging device is not mounted, and a night time ocular optical system position which is used when the night time imaging device is mounted.

The present invention also provides a telescopic sight which is characterized by the fact that in the above-mentioned telescopic sight, [a] the ocular tube body equipped with the above-mentioned ocular optical system is installed so that said ocular tube body can be rotated relative to the telescopic sight main body between a day time ocular optical system position in which the night time imaging device is not mounted, and a night time ocular optical system position which allows the mounting of the night time imaging device, [b] an alignment hole which is aligned with the mounting hole of the telescopic sight main body in the night time ocular optical system position which allows the mounting of the night time imaging device is formed in the above-mentioned ocular tube body, and [c] a cylindrical cover part which closes off the mounting hole of the telescopic sight main body in the day time ocular optical system position in which the night time imaging device is not mounted is provided [on the above-mentioned ocular tube body].

Here, when the night time imaging device is not mounted, the ocular tube body is in the day time ocular optical system position with respect to the telescopic sight main body so that the mounting hole in the telescopic sight main body is closed off by the cylindrical cover part. When the night time imaging device is to be mounted, the ocular tube body is rotated to the night time ocular optical system position which allows the mounting of the night time imaging device, so that the cylindrical cover part is removed from the mounting hole in the telescopic sight main body, and so that the alignment hole is aligned, thus allowing the mounting of the night time imaging device in the mounting hole of the telescopic sight main body so that night time sighting is possible in this state. Conversely, when the night time imaging device is removed from the mounting hole of the telescopic sight main body, the ocular tube body is rotated to the day time ocular optical system position, so that the mounting hole can be closed off by the cylindrical cover part. Day time sighting is possible in this state.

The present invention also provides a telescopic sight which is characterized by the fact that in the above-mentioned telescopic sight, [a] a guide pin is fastened to the telescopic sight main body, [b] a guide hole with which said guide pin engages is formed in the ocular tube body, and [c] said guide hole consists of [i] a linear guide hole part which guides the ocular tube body linearly in the direction of the optical axis from [1] the night time ocular optical system position in which the alignment hole is aligned with the mounting hole, and in which the mounting of the night time imaging device is allowed, to [2] the day time ocular optical system position, and [ii] a circular-arc-form rotational guide hole part which guides the rotation of the ocular tube body (that has been caused to move linearly from the night time ocular optical system position to the day time ocular optical system position by the above-mentioned linear guide hole part) from an aligned rotational position in which the alignment hole of the ocular tube body is aligned with the mounting hole of the telescopic sight main body to a closing rotational position in which the cylindrical cover part closes off the mounting hole.

In this construction, as a result of the engagement of the linear guide hole portion of the guide hole formed in the ocular tube body with the above-mentioned guide pin fastened to the telescopic sight main body, the ocular tube body can be linearly guided along the optical axis between [1] the above-mentioned night time ocular optical system position in which the alignment hole is aligned with the mounting hole, and in which the mounting of the night time imaging device is allowed, and [2] the above-mentioned day time ocular optical system position. Furthermore, as a result of the engagement of the circular-arc-form rotational guide hole portion [with the above-mentioned guide pin], the ocular tube body which has moved to the day time ocular optical system position can be rotated from the above-mentioned aligned rotational position in which the alignment hole is aligned with the mounting hole of the telescopic sight main body, and can be guided to the above-mentioned closing rotational position in which the cylindrical cover part closes off the mounting hole. Accordingly, the opening and closing of the guide hole accompanying the mounting of the night time imaging device in the mounting hole of the telescopic sight main body or the removal of said imaging device from said mounting hole, and the movement of the ocular tube body between the day time ocular optical system position and the night time ocular optical system position, can be reliably performed as intended, without any error.

The present invention also provides a telescopic sight which is characterized by the fact that in the above-mentioned telescopic sight, a moving elasticity imparting means is provided which applies an elastic force to the ocular tube body that drives the ocular tube body relative to the telescopic sight main body along the linear guide hole part of the guide hole from the day time ocular optical system position toward the night time ocular optical system position in which the alignment hole is aligned with the mounting hole, and in which the mounting of the night time imaging device is allowed.

Here, since an elastic force which drives the ocular tube body relative to the telescopic sight main body along the linear guide hole part of the guide hole from the day time ocular optical system position toward the night time ocular optical system position can be applied by the above-mentioned moving elasticity imparting means, the system can be maintained in a state in which the alignment hole is reliably aligned with the mounting hole in the night time ocular optical system position which allows the mounting of the night time imaging device.

The present invention also provides a telescopic sight which is characterized by the fact that in the above-mentioned telescopic sight a transparent plate is installed in the ocular side opening of an objective tube body which is equipped with the aforementioned objective optical system, so that said objective tube body is sealed.

Similarly, the present invention also provides a telescopic sight which is characterized by the fact that in the above-mentioned telescopic sight a transparent plate is installed facing the objective side opening of the ocular tube body equipped with the ocular lens system, so that said ocular tube body is sealed.

As a result of the installation of the above-mentioned transparent plate facing the ocular side opening of the above-mentioned objective tube body or the object side opening of the above-mentioned ocular tube body, the objective optical system and ocular optical system can be sealed off from the outside air, so that condensation on the lens surfaces of the respective optical systems can be prevented when the night time imaging device is attached to or detached from the telescopic sight main body.

The present invention also provides a telescopic sight which is characterized by the fact that in the above-mentioned telescopic sight a dry gas is sealed inside the objective tube body or ocular tube body of the telescopic sight main body.

As a result of this construction, condensation on the lens surfaces of the respective optical systems can be even more effectively prevented when the night time imaging device is attached to or detached from the telescopic sight main body.

The present invention also provides a telescopic sight which is characterized by the fact that in the above-mentioned telescopic sight the above-mentioned telescopic sight main body is equipped with an attachment part for attachment to a gun barrel.

As a result, the telescopic sight main body of the present invention can be attached to a gun barrel and used.

WORKING CONFIGURATIONS OF THE INVENTION

Below, a working configuration of the present invention will be described in detail on the basis of the telescopic sight illustrated in the attached Figures.

Figure 1:
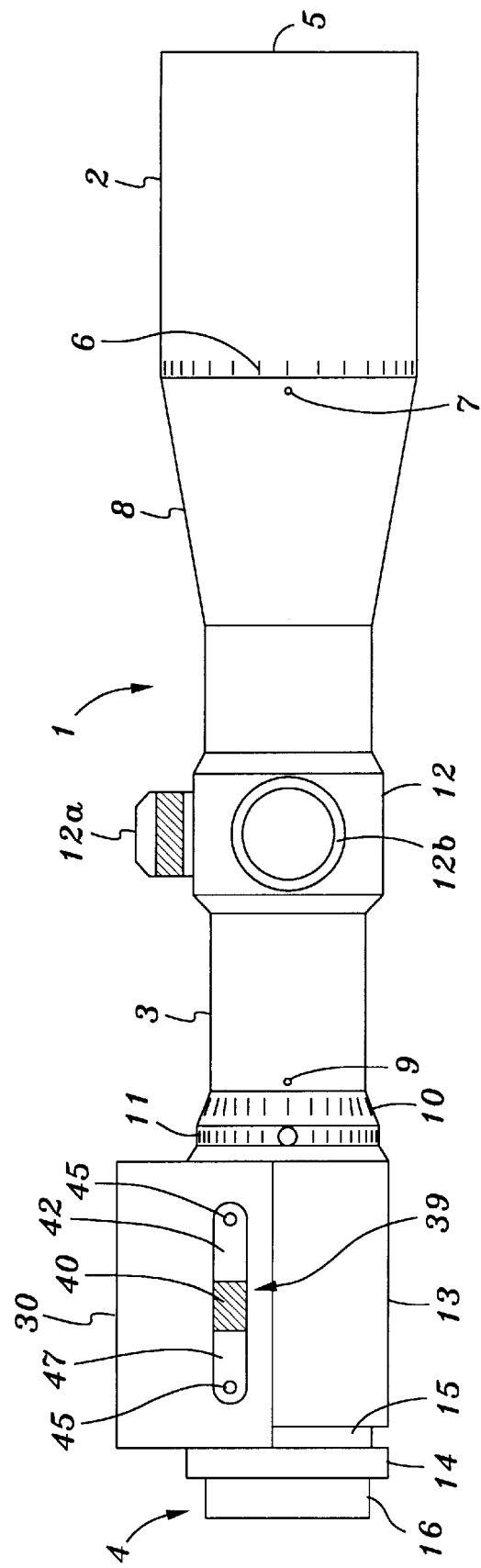
FIG. 1. is a schematic side view which illustrates one embodiment of the telescopic sight of the present invention used at night.
Figure 2:
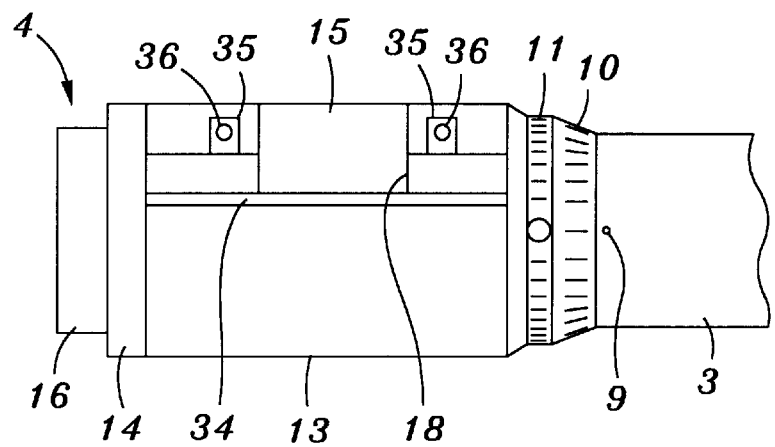
FIG. 2 is a schematic side view which illustrates the essential parts of one embodiment of the telescopic sight of the present invention used in the day time.
Figure 3:
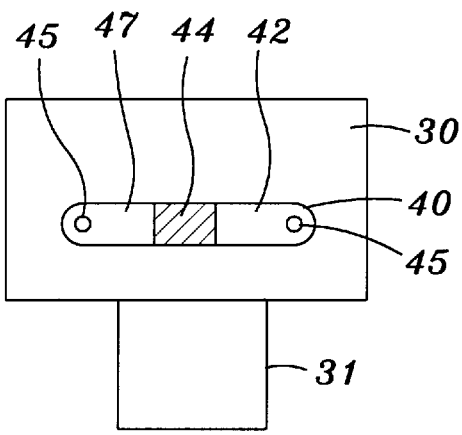
FIG. 3 is a schematic exploded side view which shows the essential parts of one embodiment of the telescopic sight of the present invention in an exploded state.
Figure 3:
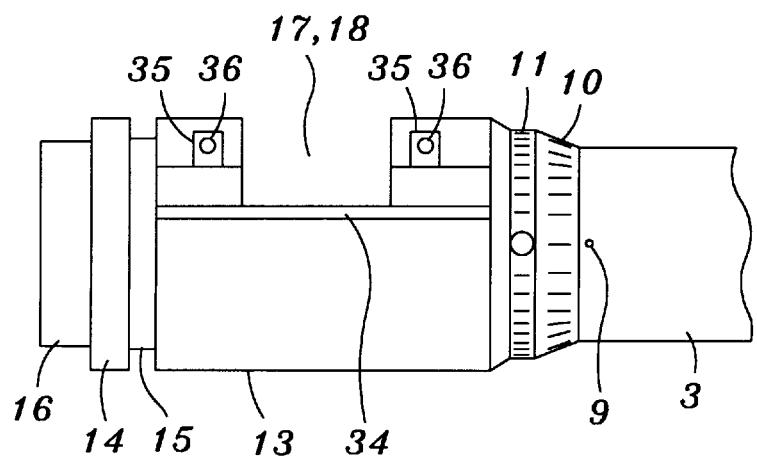

In FIG. 1, 1 indicates a telescopic sight main body which has a day time sighting optical system equipped with an objective optical system and an ocular optical system. The telescopic sight of the present invention is characterized by the fact that a night time imaging device 30 equipped with a night time imaging optical system can be mounted in a detachable manner without splitting the aforementioned telescopic sight main body 1. FIG. 2 shows the state in which the telescopic sight is used as a day time telescopic sight with the night time imaging device 30 removed from the telescopic sight main body 1. FIG. 3 shows how the night time imaging device 30 equipped with a night time imaging optical system 31 is made detachable without splitting the telescopic sight main body 1.

Thus, in the present invention, a telescopic sight for night time use can be formed by mounting the aforementioned night time imaging device 30 equipped with a night time imaging optical system without splitting the aforementioned telescopic sight main body 1 which is equipped with a day time sighting optical system. Furthermore, a telescopic sight for day time use can be formed by removing the aforementioned night time imaging device 30 equipped with a night time imaging optical system without splitting the aforementioned telescopic sight main body 1.

In FIG. 1, the telescopic sight main body 1 which has a day time sighting optical system consists of an objective tube body 2, 3 containing a conventional universally known objective optical system, and an ocular tube body 4 containing an ocular optical system. The objective tube body 2, 3 consists of an intermediate cylindrical part 3 which is fastened to the gun barrel, and an objective lens mirror tube part 2 which is integrally installed so that said tube part 2 can be rotated relative to the indicator 7 at the tip end barrel part 8 of the intermediate cylindrical part 3 in order to set the focal distance according to the scale 6. A gripping part with a surface containing projections and indentations, consisting of a roulette, etc., used for rotational operation, may be integrally formed on the circumferential surface portion of the objective lens mirror tube 2.

A sighting adjustment part 12 which has rotational operating parts 12a and 12b, etc., that perform elevation angle adjustments and deflection angle adjustments, etc., for the purpose of sighting adjustment of the orientation of the gun barrel and the optical axis of the telescopic sight main body 1 to the actual conditions of shooting when the telescopic sight is attached to the gun is installed on the intermediate portion of the intermediate cylindrical part 3. Furthermore, a zoom ring 10 is installed (so that said zoom ring can be rotated in order to allow setting of the magnification in accordance with a scale relative to an indicator 9 located on the rear end portion of the intermediate cylindrical part 3 of the objective tube body) in the boundary area between the intermediate cylindrical part 3 and the outer circumferential frame barrel part 13 of the ocular tube body 4. 11 indicates an operating part with an indented and projecting surface which is formed as an integral part of the zoom ring 10. The system is constructed so that a zoom lens mechanism contained in the intermediate cylindrical part 27 operates in linkage with the rotation of the zoom ring 10 by means of a conventional universally known mechanism not shown in the Figures. Furthermore, a transparent plate 26 consisting of a thin glass or plastic material is installed in the ocular side opening located in the rear end portion of the intermediate cylindrical part 3, so that the interior of the objective tube body 2, 3 is sealed. The interior of the objective tube body 2, 3 is formed in an air-tight manner, and nitrogen gas or dry air is sealed inside so that condensation is prevented.

The present invention is characterized by the fact that in the above-mentioned telescopic sight, the night time imaging device 30 is mounted in a detachable manner so that the night time imaging optical system 31 is interposed between the above-mentioned objective optical system and ocular optical system of the telescopic sight main body 1. As a result of this construction, it is possible, by utilizing an optical space in which optical functions can be divided between the objective optical system and ocular optical system of the telescopic sight main body 1, to mount the night time imaging device 30 in a detachable manner so that the night time imaging optical system is interposed without complicating the sighting optical system.

Furthermore, the present invention is characterized by the fact that in the above-mentioned telescopic sight, a mounting hole 18 which is used to mount the night time imaging optical system 31 of the night time imaging device 30 is formed in the outer circumferential surface of the telescopic sight main body 1, and the night time imaging device 30 is mounted in a detachable manner in said mounting hole 18. Since the night time imaging device 30 can be detachably mounted by inserting the night time imaging optical system 31 into a mounting hole 18 formed in the outer circumferential surface of the telescopic sight main body 1, the night time imaging device 30 can be quickly, easily and reliably mounted in or removed from the mounting hole 18 in the outer circumferential surface using one hand, while the gun is held with the other hand after the telescopic sight main body 1 has been fastened to the gun.

As is shown in the Figures, the telescopic sight main body 1 of the present invention is constructed as a cylindrical body in which the intermediate cylindrical part 3 of the objective tube body 2, 3 and the outer circumferential frame barrel part 13 of the ocular tube body 4 are integrally fastened together. Furthermore, the aforementioned mounting hole 18 is formed in the outer circumferential frame barrel part 13 of the ocular mirror tube body 4. The mounting hole 18 formed in the outer circumferential frame barrel part 13 is formed so that the night time imaging optical system 31 constituting the cylindrical portion of the night time imaging device 30 can be mounted in a position which is such that the object optical system side light-receiving part 33 and ocular optical system side imaging part 32 coincide with the optical axes of the objective optical system lenses and ocular optical system lenses 28 and 29 of the telescopic sight main body 1.

The night time imaging optical system 31 of the night time imaging device 30 is conventionally known as an imaging device equipped with an electron multiplier. In this optical system, a disk-form light-receiving part 33 formed from a photoelectric material is installed facing the above-mentioned objective optical system, and a disk-form imaging part 32 formed from a fluorescent material is installed facing the ocular optical system. An electron lens is installed between the light-receiving part 33 and the imaging part 32, and an electron multiplier is installed in close proximity to the imaging part 32. In this example, a micro-channel plate is used as the electron multiplier. This micro-channel plate is formed arranging a large number of extremely fine pores in rows. The electrons which enter these pores are repeatedly reflected from the inside surfaces of the pores, and each time the electrons are reflected, the number of electrons is multiplied. At night, extremely weak light which enters the objective lens opening part 5 from the target, and which cannot be seen using the optical system in the objective tube body 2, 3, is converted into electrons by the light-receiving part 33, and these electrons are conducted to the electron multiplier by the electron lens. Accordingly, these electrons are multiplied to a large number of electrons by the above-mentioned electron multiplier; the resulting electrons then reach the imaging part 32 and are converted into an image. In this way, an image of the target can be seen at night.

In the above-mentioned telescopic sight of the present invention, if the system is constructed so that the image focusing position in the night time sighting optical system coincides with the image focusing position of the objective lens system in the day time sighting optical system when the night time imaging optical system 31 is interposed between the objective optical system and ocular optical system of the telescopic sight main body 1 which has the above-mentioned day time sighting optical system, then an integral installation in which the position of the ocular tube body 4 is fixed with respect to the objective tube body 2, 3 of the telescopic sight main body 1 is possible. In this case, an opening-and-closing cover is installed on the mounting hole 18 formed in the outer circumferential surface of the telescopic sight main body 1; a telescopic sight for night time use is formed by opening this cover and mounting the night time imaging device, and a telescopic sight for day time use is formed by removing the night time imaging device and closing the cover.

In regard to the opening-and-closing cover used in this case, covers with various types of conventional universally known structures, such as detachable covers, hinge type covers, direct sliding or rotary sliding opening-and-closing covers or magnetic covers, etc., may be used.

However, if the system is constructed so that the image focusing position in the night time sighting optical system does not coincide with the image focusing position of the objective lens system in the day time sighting optical system when the night time imaging optical system 31 is interposed between the objective optical system and ocular optical system of the telescopic sight main body 1 which has the above-mentioned day time sighting optical system (as in the embodiment shown in the Figures), then it is necessary to install [the ocular tube body 4] so that the position of the ocular tube body 4 can be moved relative to the objective tube body 2, 3 of the telescopic sight main body 1 between a day time ocular optical system position in which the night-time imaging device is not mounted, and a night time ocular optical system position which allows the mounting of the night time imaging device.

Here, in cases where the focusing position of the objective optical system that is to be observed by the ocular optical system is displaced as a result of the night time imaging optical system being interposed between the objective optical system and ocular optical system of the telescopic sight main body, clear sighting corresponding to day time or night time conditions can be achieved by moving the ocular tube body between the above-mentioned day time ocular optical system position in which the night time imaging device is not mounted, and the above-mentioned night time ocular optical system position which is used when the night time imaging device is mounted.

In the case of the embodiment shown in the Figures, the ocular tube body 4 is equipped with [a] an ocular lens mirror tube part 16 which is integrally equipped with ocular optical system lenses 28 and 29 located inside, and which is also integrally equipped with a transparent plate 50 (used for sealing) on the objective optical system side, and [b] a cylindrical cover part 15 which is integrally fastened to the ocular lens mirror tube part 16 and which has a length that extends to the outer circumference of the aforementioned intermediate cylindrical part 3 along the inner circumference of the aforementioned outer circumferential frame barrel part 13. The cylindrical cover part 15 of the ocular tube body 4 has a construction which allows said cylindrical cover part 15 to slide so that linear movement along the direction of the optical axis (while said cover part 15 is in internal contact with the outer circumferential frame barrel part 13 of the telescopic sight main body 1), and so that rotation about the optical axis is possible. Furthermore, [the ocular tube body 4] is equipped with an alignment hole 17 which is aligned with the mounting hole 18 of the telescopic sight main body 1 in the night time ocular optical system (attachment) position which allows the mounting of the night time imaging device 30, and [said optical mirror tube main body 4] is constructed so that the cylindrical cover part 15 closes off the mounting hole 18 in the day time ocular optical system position (in which the alignment hole 17 is rotated approximately 180 degrees about the optical axis) when the night time imaging device 30 is not mounted.

Here, when the night time imaging device 30 is not mounted, the ocular tube body 4 is in the day time ocular optical system position with respect to the telescopic sight main body 1 so that the mounting hole 18 in the telescopic sight main body 1 is closed off by the cylindrical cover part 15. When the night time imaging device 30 is to be mounted, the ocular tube body 4 is rotated to the night time ocular optical system position which allows the mounting of the night time imaging device 30, so that the cylindrical cover part 15 is removed from the mounting hole 18 in the telescopic sight main body 1, and so that the alignment hole 17 is aligned, thus allowing the mounting of the night time is imaging device 30 in the mounting hole 18 of the telescopic sight main body 1 so that night time sighting is possible in this state. Conversely, when the night time imaging device 30 is removed from the mounting hole 18 of the telescopic sight main body 1, the ocular tube body 4 is rotated to the day time ocular optical system position, so that the mounting hole 18 can be closed off by the cylindrical cover part 15. Day time sighting is possible in this state.

Figure 4:
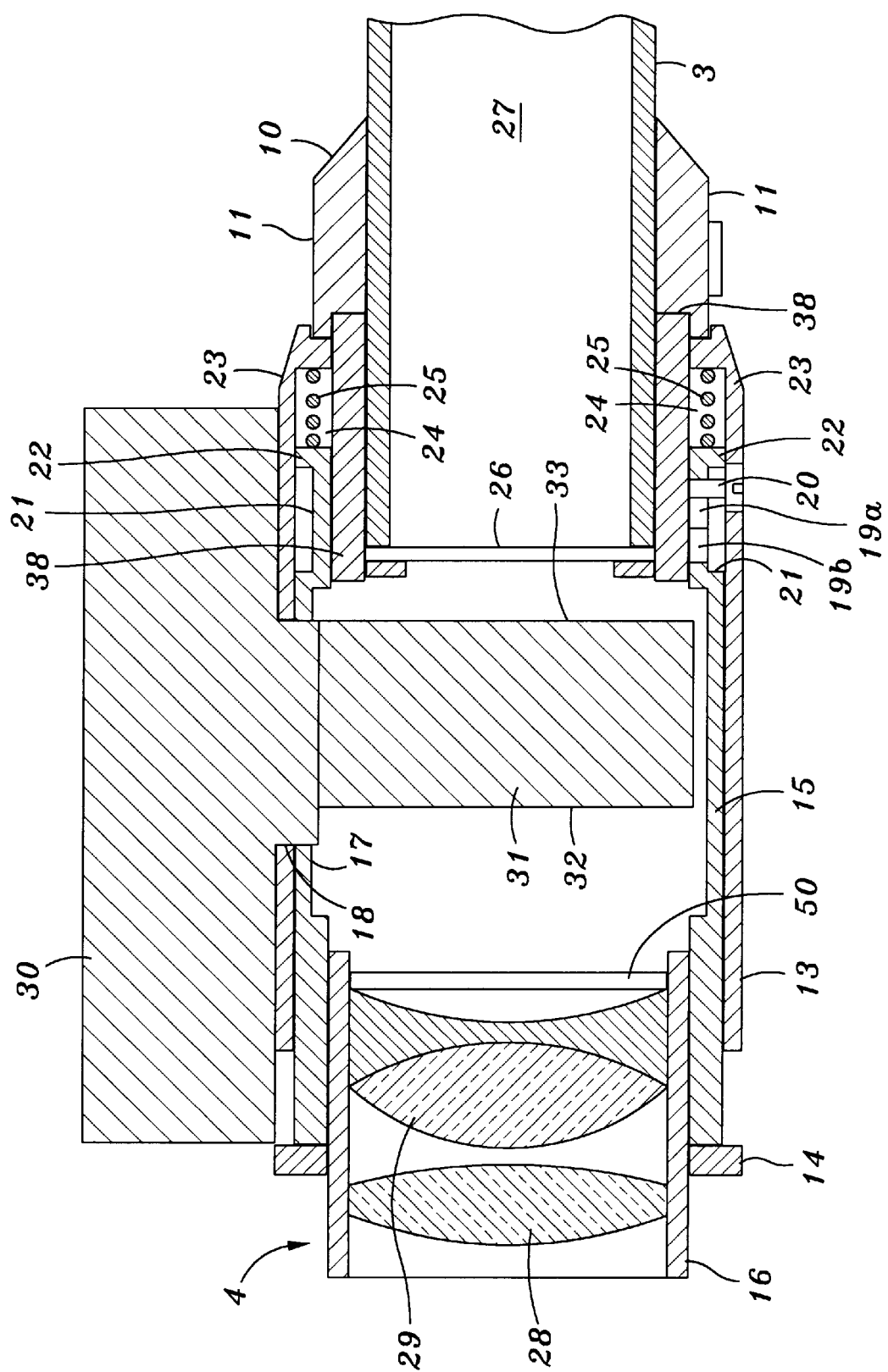
FIG. 4 is a schematic sectional view which illustrates the essential parts of one embodiment of the telescopic sight of the present invention used at night.
Figure 5:
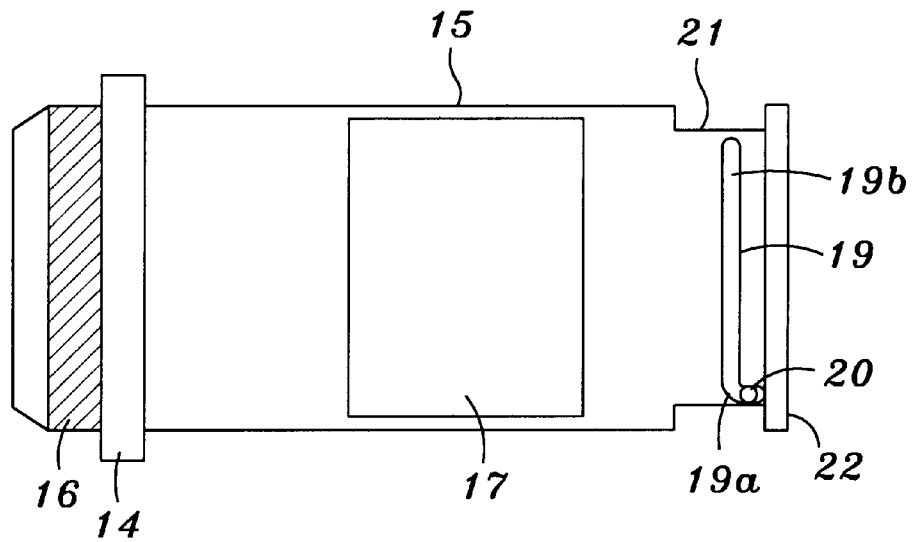
FIG. 5 is a schematic plan view showing one embodiment of the telescopic sight of the present invention with the essential parts extracted.

Furthermore, the present invention is [also characterized by the fact that] in the above-mentioned telescopic sight, as is shown in FIG. 4 or FIG. 5, a guide pin 20 is fastened to the objective side frame end portion 23 of the outer circumferential frame barrel part 13 of the ocular mirror tube [main] body 4 of the telescopic sight main body 1, and a guide hole 19 with which said guide pin 20 engages is formed in the objective side end portion 21 of the cylindrical cover part 15 of the ocular tube body 4. This guide hole 19 consists of [i] a linear guide hole part 19a which guides the ocular tube body 4 linearly in the direction of the optical axis from [1] the night time ocular optical system position in which the alignment hole 17 is aligned with the mounting hole 18, and in which the mounting of the night time imaging device 30 is allowed, to [2] the day time ocular optical system position, and [ii] a circular-arc-form rotational guide hole part 19b which guides the rotation of the ocular tube body 4 (that has been caused to move linearly from the night time ocular optical system position to the day time ocular optical system position by the above-mentioned linear guide hole part 19a) from an aligned rotational position in which the alignment hole 17 of the ocular tube body 4 is aligned with the mounting hole 18 of the telescopic sight main body 1 to a closing rotational position in which the cylindrical cover part 15 closes off the mounting hole 18.

In this construction, as a result of the engagement of the linear guide hole portion 19a of the guide hole 19 formed in the ocular tube body 4 with the above-mentioned guide pin 20 fastened to the telescopic sight main body 1, the ocular tube body 4 can be linearly guided along the optical axis between [1] the above-mentioned night time ocular optical system position in which the alignment hole 17 is aligned with the mounting hole 18, and in which the mounting of the night time imaging device 30 is allowed, and [2] the above-mentioned day time ocular optical system position. Furthermore, as a result of the engagement of the circular-arc-form rotational guide hole portion 19b [with the above-mentioned guide pin 20], the ocular tube body 4 which has moved to the day time ocular optical system position can be rotated from the above-mentioned aligned rotational position in which the alignment hole 17 is aligned with the mounting hole 18 of the telescopic sight main body 1, and can be guided to the above-mentioned closing rotational position in which the cylindrical cover part 15 closes off the mounting hole 18. Accordingly, the opening and closing of the guide hole 18 accompanying the mounting of the night time imaging device 30 in the mounting hole 18 of the telescopic sight main body 1 or the removal of said imaging device 30 from said mounting hole 18, and the movement of the ocular tube body 4 between the day time ocular optical system position and the night time ocular optical system position, can be reliably performed as intended, without any error.

14 indicates an operating ring used for operation of the ocular tube body 4 which is installed on the ocular side end portion of the cylindrical cover part 15. In the case of the embodiment [shown in the Figures], this operating ring 14 also functions as a positioning member when the night time imaging device 30 is mounted. In cases where the ocular tube body 4 is not in the night time ocular optical system position, or in cases where the night time imaging optical system 31 of the night time imaging device 30 is mounted backwards, the operating ring 14 creates an obstacle by colliding with the frame of the night time imaging device 30, thus preventing mounting so that erroneous mounting can be prevented.

Furthermore, the present invention is [also characterized by the fact that] in the above-mentioned telescopic sight, a moving elasticity imparting means 25 is provided which applies an elastic force to the ocular tube body 4 that drives the ocular tube body 4 is (relative to the telescopic sight main body 1) along the linear guide hole part 19a of the guide hole 19 from the day time ocular optical system position toward the night time ocular optical system position (in which the alignment hole 17 is aligned with the mounting hole 18, and in which the mounting of the night time imaging device 30 is allowed).

In this construction, since an elastic force which drives the ocular tube body 4 (relative to the telescopic sight main body 1) along the linear guide hole part 19a of the guide hole 19 from the day time ocular optical system position toward the night time ocular optical system position can be applied, the system can be maintained in a state in which the alignment hole 17 is reliably aligned with the mounting hole 18 in the night time ocular optical system position which allows the mounting of the night time imaging device 30. Furthermore, in the night time ocular optical system position after the night time imaging device 30 has been removed, the ocular tube body 4 is moved relative to the telescopic sight main body 1 along the linear guide hole part 19a of the guide hole 19 to the day time ocular optical system position against the resistance of the moving elasticity imparting means 25, and is rotated along the circular-arc-form rotational guide hole part 19b so that the mounting hole 18 is closed off by the cylindrical cover part 15, thus allowing use as a day time telescopic sight.

In the case of the embodiment shown in the Figures, the moving elasticity imparting means 25 consists of a coil spring. This coil spring is installed around the outer circumference of a cylindrical part 38 which is integrally installed on the outer circumference of the ocular side end portion of the intermediate cylindrical part 3 of the objective tube body, so that an expanding elastic force is applied to the inside of an accommodating part 24 inside the objective side frame end portion 23 of the outer circumferential frame barrel part 13, thus applying an elastic force to the ocular tube body 4 which drives the ocular tube body 4 toward the night time ocular optical system position between the objective side frame end portion 23 of the outer circumferential frame barrel part 13 and the objective side tip end frame portion 22 of the cylindrical cover part 15 of the ocular tube body 4.

The moving elasticity imparting means 25 maintains a fixed position as a result of [the engagement of] the rotational guide hole part 19b with the guide pin 20 in this day time ocular optical system position and the simultaneous elastic engagement of the moving elasticity imparting means 25 with the objective side tip end frame portion 22 of the ocular tube body 4; accordingly, the moving elasticity imparting means 25 has the effect of elastically fastening the ocular tube body 4 in the day time ocular optical system position, and thus also acts as a fixed position maintaining means for the ocular tube body 4.

Furthermore, the moving elasticity imparting means 25 is not limited to the coil spring shown in the embodiment illustrated in the Figures; a plate spring made of metal or plastic, or an elastic rubber or plastic material, etc., may also be appropriately used.

Moreover, in FIG. 4, the zoom ring 10 and the zoom mechanism inside the operating part 11 (with an indented and projecting surface) and the intermediate cylindrical part 3 of the objective tube body have a conventional universally known structure; accordingly, these parts are omitted from the figure.

In the above-mentioned telescopic sight, the present invention has a construction in which the night time imaging device 30 is mounted on the outer circumference surface of the telescopic sight main body 1 in a manner which allows attachment or detachment by a one-touch operation using a one-touch attachment and detachment mechanism 40.

Figure 6:
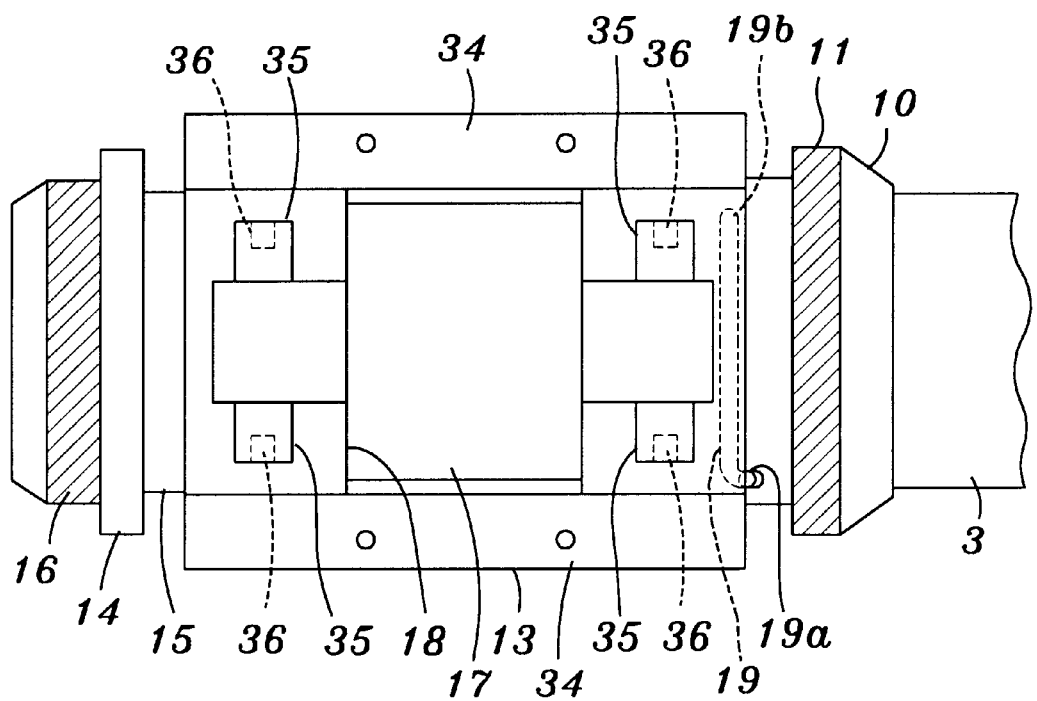
FIG. 6 is a schematic plan view which shows the essential parts of one embodiment of the telescopic sight of the present invention in an exploded state.
Figure 7:
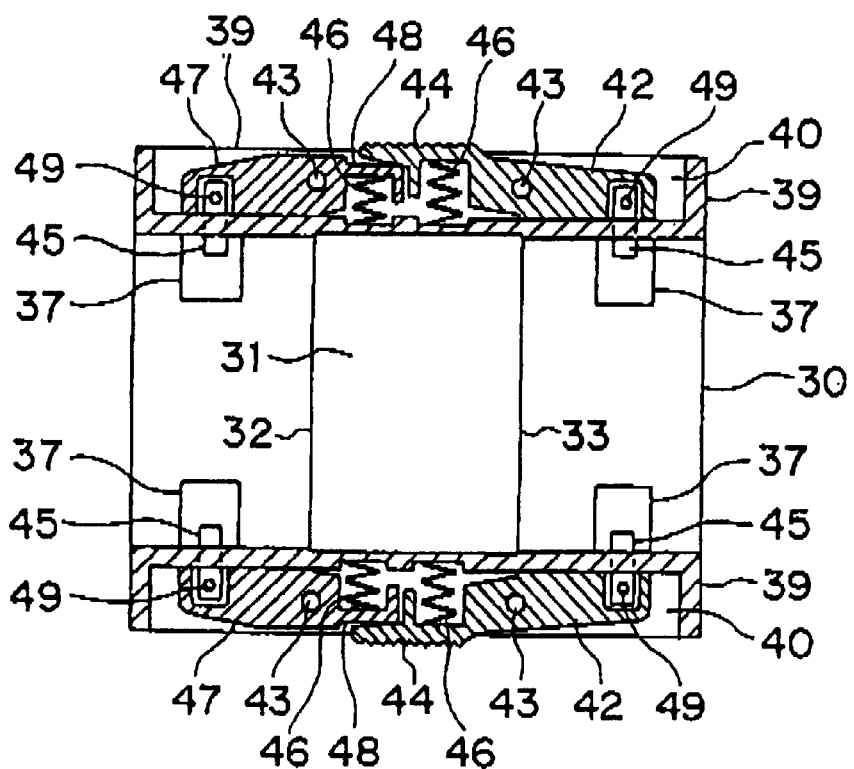
FIG. 7 is a schematic sectional bottom view which shows the essential parts of one embodiment of the telescopic sight of the present invention used at night in an exploded state with some of the parts being shown in cross section.

As is shown in FIG. 6, the one-touch attachment and detachment mechanism 40 for the night time imaging device 30 shown in FIG. 3 or FIGS. 6 through 8 is provided with [a] carrying frame parts 34 which are installed on both sides of the mounting hole 18 parallel to the direction of the optical axis, and which have a square shape as seen in a plan view of the outer circumferential frame barrel part 13 of the aforementioned ocular tube body 4, and [b] an engaging barrel part which is equipped with engaging projection parts 35 and engaging hole parts 36 located in symmetrical positions with respect to the direction cutting across the optical axis. Meanwhile, in the position where the night time imaging optical system 31 of the night time imaging device 30 is engaged with the mounting hole 18, side frame parts 39 of the night time imaging device 30 align with the above-mentioned carrying frame parts 34, and, as is shown in FIG. 7, engaging recessed grooves 37 and engaging pins 45 which are positioned on both sides of the night time imaging optical system 31 of the night time imaging device 30 facing the engaging inside barrel part are disposed so that these parts engage with the engaging projection parts 35 and engaging hole parts 36 of the engaging barrel part. Here, the one-touch attachment and detachment mechanism 40 is constructed so that the engaging pins 45 can be engaged with the engaging hole parts 36 in both side frame parts 39 of the night time imaging device 30 by means of a one-touch operation performed with one hand, and so that these parts can also be released by means of such a one-touch operation. In the case of the embodiment, as is shown in FIG. 7, the engaging pins 45 positioned on the left and right of the night time imaging optical system 31 with respect to the figure are attached by means of pins 49 to the operating tip end portions of operating members 42 and 47 which swing about supporting shafts 43, so that the pins 45 are guided into insertion holes in the side frame parts 39, and so that the pins 45 protrude while maintaining right angles toward the engaging hole parts 36. Meanwhile, the pressing base parts 44 and 48 of the operating members 42 and 47 are overlapped so that these pressing base parts 44 and 48 can be simultaneously pressed. Spring members 46 are installed so that these spring members 46 elastically push the pressing base parts 44 and 48 of the operating members 42 and 47 in the anti-pressing direction (i.e., in the direction of protrusion of the engaging pins 45).

The one-touch attachment and detachment mechanism 40 is disposed relative to both side frame parts 39 of the night time imaging device 30; then, when the overlapped pressing base parts 44 and 48 of the operating members 42 and 47 are pressed against the force of the spring members 46 so that the center of the one-touch attachment and detachment mechanism 40 is clamped on both sides, the engaging pins 45 swing in the direction of retraction about the supporting shafts 43. Conversely, when the fingers are removed from the pressing base parts 44 and 48, the engaging pins 45 are caused to protrude by the elastic pushing force of the spring members 46. Accordingly, as is shown in FIG. 3, if inclined guide surfaces which introduce the engaging pins 45 into the engaging hole parts 36 from above when the night time imaging device 30 is mounted from above (so that the night time imaging optical system 31 is engaged in the opening part of the mounting hole 18 formed in the outer circumferential frame barrel part 13 of the ocular tube body 4) are installed facing downward in the direction of engagement from the tops of the engaging projection parts 35, then the engaging recessed grooves 37 can be engaged with the engaging projection parts 35, and the engaging pins 45 can be engaged with the engaging hole parts 36, merely by aligning both side frame parts 39 of the night time imaging device 30 with the carrying frame parts 34 of the outer circumferential frame barrel part 13. Of course, in cases where guide means which introduce the engaging pins 45 into the engaging hole parts 36 are not provided, the engaging pins 45 can be retracted by clamping the center of the one-touch attachment and detachment mechanism 40. Accordingly, if the clamping force is released at the same time that [a] both side frame parts 39 of the night time imaging device 30 are aligned with the carrying frame parts 34 of the outer circumferential frame barrel part 13 and [b] the engaging recessed grooves 37 are engaged with the engaging projection parts 35, the engaging pins 45 can be engaged with the engaging hole parts 36 in a one-touch operation using the elastic spring force of the spring members 46. Similarly, the night time imaging device 30 can be released in a one-touch operation by clamping the center of the one-touch attachment and detachment mechanism 40.

Figure 8:
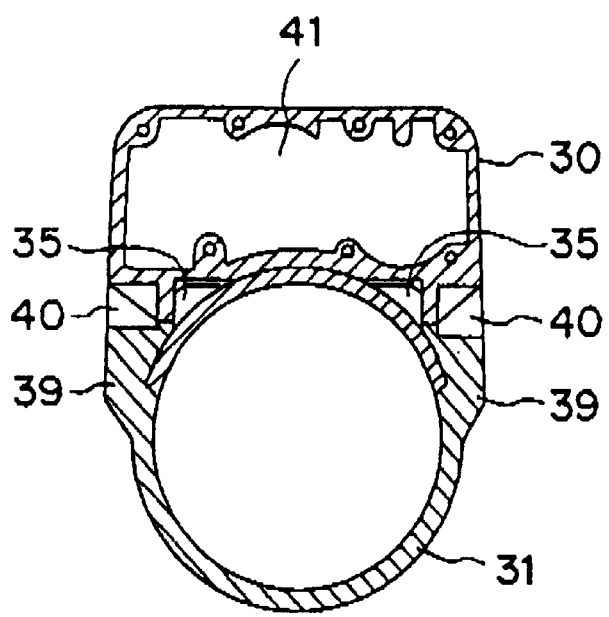
FIG. 8 is a schematic longitudinal-sectional view which shows the essential parts of one embodiment of the telescopic sight of the present invention used at night in an exploded state with some of the parts being shown in longitudinal section.

In addition, stopping parts which determine the pressing limit position are installed on the pressing base parts 44 and 48 so that these stopping parts protrude in the direction in which the spring member 46 are pushed. In FIG. 8, a battery box 41 equipped with a switch is installed on top of the night time imaging device 30, and a battery which acts as a power supply for the electron multiplier equipped imaging apparatus of the night time imaging optical system 31 is accommodated in this battery box 41. Furthermore, in FIG. 8, as is indicated by the symbol 35, the installation positions of the engaging projection parts 35 which would originally be located on the engaging barrel part of the outer circumferential frame barrel part 13 of the ocular tube body 4 at points corresponding to the installation positions of the one-touch attachment and detachment mechanism 40 in both side frame parts 39 of the night time imaging device 30 are indicated in hypothetical terms.

Instead of engaging pins 45 which are caused to protrude by an elastic spring force, it would also be possible to use, as the above-mentioned one-touch attachment and detachment mechanism 40, a construction in which spherical bodies which are caused to protrude by an elastic spring force are installed in both side frame parts 39 of the night time imaging device 30 so that said spherical bodies are free to rotate, with portions constituting half or less of the spherical bodies being caused to engage with the engaging hole parts 36, so that engagement is accomplished by a one-touch operation when the night time imaging device 30 is mounted, and so that release is accomplished by a one-touch operation when a releasing force is applied. Alternatively, it would also be possible to use a construction in which plastic hook parts which undergo elastic deformation on one engaging side are engaged in a manner which allows disengagement with elastically deformable recesses on the other engaging side, or to use one-touch attachment and detachment mechanisms with various conventional universally known structures, such as a system in which attachment and detachment are accomplished by a magnetic system, etc.

Furthermore, the transparent plate 50 of the ocular lens mirror tube part 16, which is integrally equipped with ocular optical system lenses 28 and 29 located inside, and which is integrally equipped with a transparent plate 50 used for sealing on the objective optical system side, seals nitrogen gas or dry air inside the ocular lens mirror tube part 16 and cuts the ocular optical system off from the outside air, so that condensation on the ocular optical system lens surfaces can be prevented when the night time imaging device 30 is attached to or detached from the telescopic sight main body 1.

Merits of the Invention

As was described above, the telescopic sight of the present invention has a construction in which a night time imaging device equipped with a night time imaging optical system is mounted in a detachable manner on a telescopic sight main body which has a day time sighting optical system equipped with an objective optical system and an ocular optical system, without removing the day time sighting optical system from said telescopic sight main body. As a result, a telescopic sight for night time use can be formed by mounting a night time imaging device equipped with a night time imaging optical system without splitting the telescopic sight main body which is equipped with a day time sighting optical system. Furthermore, a telescopic sight for day time use can be formed by removing the above-mentioned night time imaging device equipped with a night time imaging optical system without splitting the above-mentioned telescopic sight main body. Accordingly, the present invention possesses the following merit: i.e., the need for a troublesome procedure in which the objective tube body and ocular tube body are disassembled and reconnected as a conventional method is eliminated, so that use in the field, etc., is convenient.

The present invention also has a construction which is characterized by the fact that in the above-mentioned telescopic sight, the night time imaging device is mounted in a detachable manner so that the night time imaging optical system is interposed between the above-mentioned objective optical system and ocular optical system of the telescopic sight main body. As a result, the present invention possesses the merit of being designed so that the following operation is possible: i.e., it is possible, by utilizing an optical space in which optical functions can be divided between the objective optical system and ocular optical system of the telescopic sight main body, to mount the night time imaging device in a detachable manner so that the night time imaging optical system is interposed without complicating the sighting optical system.

The present invention also has a construction which is characterized by the fact that in the above-mentioned telescopic sight a mounting hole which is used to mount the night time imaging optical system of the night time imaging device is formed in the outer circumferential surface of the telescopic sight main body, and the night time imaging device is mounted in a detachable manner in said mounting hole.

As a result, the present invention possesses the following merit: i.e., since the night time imaging device can be detachably mounted by inserting the night time imaging optical system into a mounting hole formed in the outer circumferential surface of the telescopic sight main body, the night time imaging device can be quickly, easily and reliably mounted in or removed from the mounting hole in the outer circumferential surface using one hand, while the gun is held with the other hand after the telescopic sight main body has been fastened to the gun.

The present invention also has a construction which is characterized by the fact that in the above-mentioned telescopic sight the night time imaging device is mounted on the outer circumference of the telescopic sight main body in a manner which allows attachment or detachment by a one-touch operation using a one-touch attachment and detachment mechanism. As a result, the present invention possesses the following merit: i.e. the night time imaging device can be quickly, easily and reliably attached or detached by means of a one-touch operation using one hand, while the gun is held with the other hand after the telescopic sight main body has been fastened to the gun.

The present invention also has a construction which is characterized by the fact that in the above-mentioned telescopic sight an opening-and-closing cover which opens and closes the above-mentioned mounting hole is disposed on the telescopic sight main body. As a result, the present invention possesses the following merit: i.e. the night time imaging device can be mounted in or removed from the mounting hole by opening or closing the opening-and-closing cover; accordingly, the night time imaging device can be mounted in or removed from the mounting hole by opening the opening-and-closing cover, and the telescopic sight can be used as a day time telescopic sight by closing the opening-and-closing cover. In this case, furthermore, a light-blocking action and anti-dust action are obtained.

The present invention also has a construction which is characterized by the fact that in the above-mentioned telescopic sight an ocular tube body equipped with the above-mentioned ocular optical system is installed so that said ocular tube body can be moved relative to the telescopic sight main body between a day time ocular optical system position in which the night time imaging device is not mounted, and a night time ocular optical system position which allows the mounting of the night time imaging device. As a result, the present invention possesses the following merit: i.e. in cases where the focusing position of the objective optical system that is to be observed by the ocular optical system is displaced as a result of the night time imaging optical system being interposed between the objective optical system and ocular optical system of the telescopic sight main body, clear sighting corresponding to day time or night time conditions can be achieved by moving the ocular tube body between a day time ocular optical system position in which the night time imaging device is not mounted, and a night time ocular optical system position which is used when the night time imaging device is mounted.

The present invention also has a construction which is characterized by the fact that in the above-mentioned telescopic sight, [a] the ocular tube body equipped with the above-mentioned ocular optical system is installed so that said ocular tube body can be rotated relative to the telescopic sight main body between a day time ocular optical system position in which the night time imaging device is not mounted, and a night time ocular optical system position which allows the mounting of the night time imaging device, [b] an alignment hole which is aligned with the mounting hole of the telescopic sight main body in the night time ocular optical system position which allows the mounting of the night time imaging device is formed in the above-mentioned ocular tube body, and [c] a cylindrical cover part which closes off the mounting hole of the telescopic sight main body in the day time ocular optical system position in which the night time imaging device is not mounted is provided [on the above-mentioned ocular tube body]. As a result, the present invention possesses the following merits: i.e. when the night time imaging device is not mounted, the ocular tube body is in the day time ocular optical system position with respect to the telescopic sight main body so that the mounting hole in the telescopic sight main body is closed off by the cylindrical cover part. When the night time imaging device is to be mounted, the ocular tube body is rotated to the night time ocular optical system position which allows the mounting of the night time imaging device, so that the cylindrical cover [part] is removed from the mounting hole in the telescopic sight main body, and so that the alignment hole is aligned, thus allowing the mounting of the night time imaging device in the mounting hole of the telescopic sight main body so that night time sighting is possible in this state. Conversely, when the night time imaging device is removed from the mounting hole of the telescopic sight main body, the ocular tube body is rotated to the day time ocular optical system position, so that the mounting hole can be closed off by the cylindrical cover part. Day time sighting is possible in this state.

The present invention also has a construction which is characterized by the fact that in the above-mentioned telescopic sight [a] a guide pin is fastened to the telescopic sight main body, [b] a guide hole with which said guide pin engages is formed in the ocular tube body, and [c] said guide hole consists of [i] a linear guide hole part which guides the ocular tube body linearly in the direction of the optical axis from [1] the night time ocular optical system position in which the alignment hole is aligned with the mounting hole, and in which the mounting of the night time imaging device is allowed, to [2] the day time ocular optical system position, and [ii] a circular-arc-form rotational guide hole part which guides the rotation of the ocular tube body (that has been caused to move linearly from the night time ocular optical system position to the day time ocular optical system position by the above-mentioned linear guide hole part) from an aligned rotational position in which the alignment hole of the ocular tube body is aligned with the mounting hole of the telescopic sight main body to a closing rotational position in which the cylindrical cover part closes off the mounting hole. As a result, the present invention possesses the following merits: i.e., as a result of the engagement of the linear guide hole portion of the guide hole formed in the ocular tube body with the above-mentioned guide pin fastened to the telescopic sight main body, the ocular tube body can be linearly guided along the optical axis between [1] the above-mentioned night time ocular optical system position in which the s alignment hole is aligned with the mounting hole, and in which the mounting of the night time imaging device is allowed, and [2] the above-mentioned day time ocular optical system position. Furthermore, as a result of the engagement of the circular-arc-form rotational guide hole portion [with the above-mentioned guide pin], the ocular tube body which has moved to the day time ocular optical system position can be rotated from the above-mentioned aligned rotational position in which the alignment hole is aligned with the mounting hole of the telescopic sight main body, and can be guided to the above-mentioned closing rotational position in which the cylindrical cover part closes off the mounting hole. Accordingly, the opening and closing of the guide hole accompanying the mounting of the night time imaging device in the mounting hole of the telescopic sight main body or the removal of said imaging device from said mounting hole, and the movement of the ocular tube body between the day time ocular optical system position and the night time ocular optical system position, can be reliably performed as intended, without any error.

The present invention also has a construction which is characterized by the fact that in the above-mentioned telescopic sight, a moving elasticity imparting means is provided which applies an elastic force to the ocular tube body that drives the ocular tube body (relative to the telescopic sight main body) along the linear guide hole part of the guide hole from the day time ocular optical system position toward the night time ocular optical system position (in which the alignment hole is aligned with the mounting hole, and in which the mounting of the night time imaging device is allowed). As a result, the present invention possesses the following merit: i.e. since an elastic force which drives the ocular tube body (relative to the telescopic sight main body) along the linear guide hole part of the guide hole from the day time ocular optical system position toward the night time ocular optical system position can be applied by the above-mentioned moving elasticity imparting means, the system can be maintained in a state in which the alignment hole is reliably aligned with the mounting hole in the night time ocular optical system position which allows the mounting of the night time imaging device.

The present invention also has a construction which is characterized by the fact that in the above-mentioned telescopic sight a transparent plate is installed in the ocular side opening of an objective tube body which is equipped with the [aforementioned] objective optical system, so that said objective tube body is sealed. Similarly, the present invention also has a construction which is characterized by the fact that in the above-mentioned telescopic sight claimed in claim 10 a transparent plate is installed facing the objective side opening of the ocular tube body equipped with the ocular lens system, so that said ocular tube body is sealed. As a result, the present invention possesses the following merit: i.e., as a result of the installation of the above-mentioned transparent plate facing the ocular side opening of the above-mentioned objective tube body or the objective side opening of the above-mentioned ocular tube body, the objective optical system and ocular optical system can be sealed off from the outside air, so that condensation on the lens surfaces of the respective optical systems can be prevented when the night time imaging device is attached to or detached from the telescopic sight main body.

The present invention also has a construction which is characterized by the fact that in the above-mentioned telescopic sight a dry gas is sealed inside the objective tube body or ocular tube body of the telescopic sight main body. As a result, the present invention possesses the following merit: i.e. condensation on the lens surfaces of the respective optical systems can be even more effectively prevented when the night time imaging device is attached to or detached from the telescopic sight main body.

The present invention also has a construction which is characterized by the fact that in the above-mentioned telescopic sight the above-mentioned telescopic sight main body is equipped with an attachment part for attachment to a gun barrel. As a result, the present invention possesses the following merit: i.e. the telescopic sight main body of the present invention can easily be attached to a gun barrel and used.

Explanation of Symbols
1 Telescopic sight main body
2 Objective tube body (objective lens tube)
3 Objective tube body (intermediate cylindrical part)
4 Ocular tube main body
5 Objective lens opening part
6 Scale
7 Indicator
8 Tip end barrel part
9 Indicator
10 Zoom ring
11 Operating part with indented and projecting surface
12 Sighting adjustment part
12a, 12b, Rotational operating parts
13 Outer circumferential frame barrel part
14 Operating ring
15 Cylindrical cover part
16 Ocular lens mirror tube part
17 Alignment hole
18 Mounting hole
19 Guide hole
20 Guide pin
21 Objective side end portion
22 Objective side end portion
23 Objective side frame end portion
24 Accommodating part
25 Moving elasticity imparting means
27 Inside of intermediate cylindrical part
28, 29, Ocular optical system lenses
30 Night time imaging device
31 Night time imaging optical system
32 Ocular optical system side imaging part
33 Objective optical system side light-receiving part
34 Carrying frame parts
35 Engaging projection parts
36 Engaging hole parts
37 Engaging recessed grooves
38 Cylindrical part
39 Side frame parts
40 One-touch attachment and detachment mechanism
41 Battery accommodating part
42 Operating members
43 Supporting shafts
44 Pressing base parts
45 Engaging pins
46 Spring members
47 Operating members
48 Pressing base parts
49 Connecting pins
50 Transparent plate

I claim:

1. A telescopic sight comprising:
(a) a night time imaging device equipped with a night time imaging optical system which is mounted in a detachable manner on
(b) a telescopic sight main body, which has a day time sighting optical system equipped with an objective optical system and an ocular optical system,
wherein the night time imaging device can be detached without detaching the day time sighting optical system from the telescopic sight main body.

2. The telescopic sight of claim 1, wherein the night time imaging device is mounted in a detachable manner so that the night time imaging optical system is interposed between the objective optical system and ocular optical system of the telescopic sight main body.

3. The telescopic sight of claim 1 further comprising a mounting hole which is used to mount the night time imaging optical system of the night time imaging device, and which mounting hole is formed in an outer circumferential surface of the telescopic sight main body, and the night time imaging device is mounted in a detachable manner in said mounting hole.

4. The telescopic sight of claim 3 wherein the night time imaging device is mounted on the outer circumference of the telescopic sight main body in a manner which allows attachment or detachment by a one-touch operation using a one-touch attachment and detachment mechanism.

5. The telescopic sight of claim 3, further comprising an opening and closing cover which opens and closes the mounting hole and is disposed on the telescopic sight main body.

6. The telescope sight of claim 1, further comprising an ocular tube body equipped with the ocular optical system and installed so that the ocular tube main body can be moved relative to the telescopic sight main body between a day time ocular optical system position in which the night time imaging device is not mounted, and a night time ocular optical system position which allows the mounting of the night time imaging device.

7. The telescopic sight of claim 6, (a) wherein the ocular tube body equipped with the ocular optical system is installed so that said ocular tube body can be rotated relative to the telescopic sight main body between a day time ocular optical system position in which the night time imaging device is not mounted, and a night time ocular optical system position which allows the mounting of the night time imaging device, (b) an alignment hole, which is aligned with the mounting hole of the telescopic sight main body in the night time ocular optical system position which allows the mounting of the night time imaging device, is formed in the ocular tube body, and (c) a cylindrical cover part, which closes off the mounting hole of the telescopic sight main body in the day time ocular optical system position in which the night time imaging device is not mounted, is provided on the ocular tube body.

8. The telescopic sight of claim 7, wherein (a) a guide pin is fastened to the telescopic sight main body, (b) a guide hole with which said guide pin engages is formed in the ocular tube body, and (c) said guide hole consists of (i) a linear guide hole part which guides the ocular tube body linearly in the direction of the optical axis from [1] the night time ocular optical system position in which the alignment hole is aligned with the mounting hole, and in which the mounting of the night time imaging device is allowed, to [2] the day time ocular optical system position, and (ii) a circular-arc-form rotational guide hole part which guides the rotation of the ocular tube body that has been caused to move linearly from the night time ocular optical system position to the day time ocular optical system position by the linear guide hole part from an aligned rotational position in which the alignment hole of the ocular tube body is aligned with the mounting hole of the telescopic sight main body to a closing rotational position in which the cylindrical cover part closes off the mounting hole.

9. The telescopic sight of claim 8, further comprising a moving elastic part which applies an elastic force to the ocular tube body and drives the ocular tube body relative to the telescopic sight main body along the linear guide hole part of the guide hole from the day time ocular optical system position toward the night time ocular optical system position in which the alignment hole is aligned with the mounting hole, and in which the mounting of the night time imaging device is allowed.

10. The telescopic sight of claim 9, further comprising a transparent plate installed in an ocular side opening of an objective tube body which is equipped with the objective optical system, so that said objective tube body is sealed.

11. The telescopic sight of claim 10 wherein the transparent plate is installed facing the objective side opening of the ocular tube body equipped with the ocular lens system, so that said ocular tube body is sealed.

12. The telescopic sight of claim 10 further comprising a dry gas sealed inside the objective tube body or ocular tube body of the telescopic sight main body.

13. The telescopic sight of claim 1, wherein the telescopic sight main body is equipped with an attachment part for attachment to a gun barrel.

* * * * *